Feb. 28, 1939.     I. O'ROURKE     2,148,873
METHOD FOR MAKING DUCTS
Filed Aug. 1, 1936     2 Sheets-Sheet 1
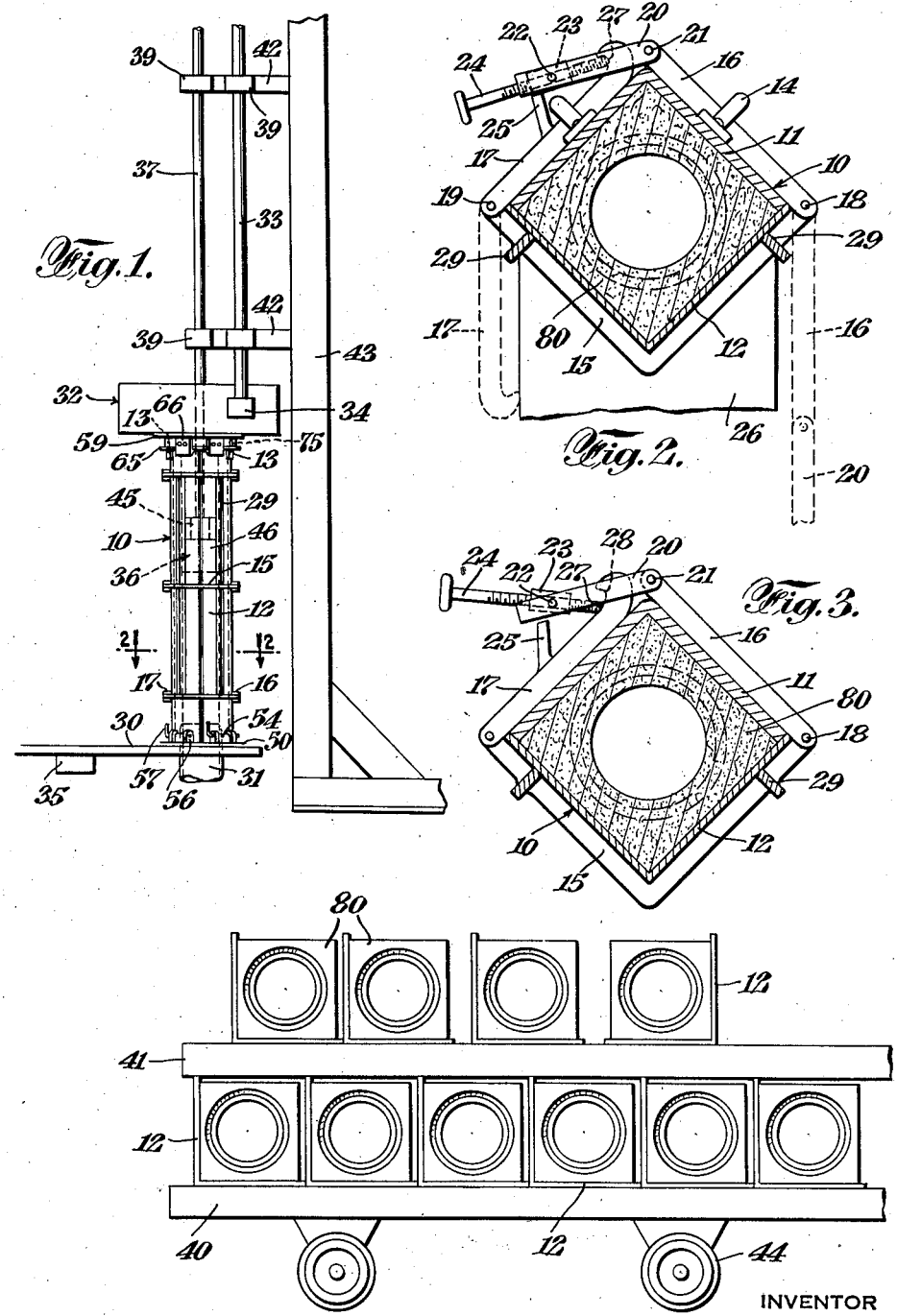
INVENTOR
Innis O'Rourke
BY
Kenyon & Kenyon
ATTORNEYS

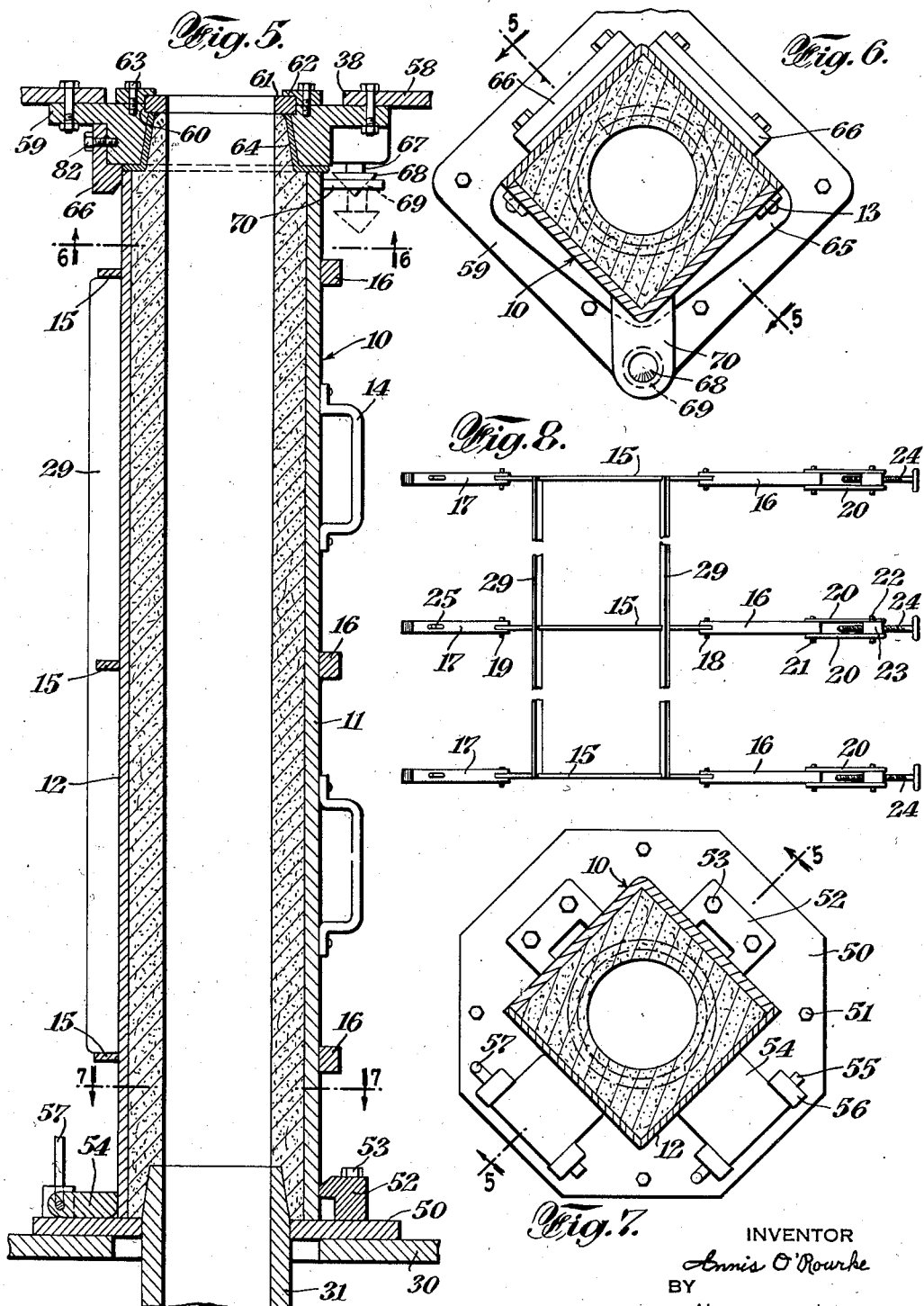

Patented Feb. 28, 1939

2,148,873

UNITED STATES PATENT OFFICE 2,148,873

METHOD FOR MAKING DUCTS

Innis O'Rourke, Great Neck, N. Y.

Application August 1, 1936, Serial No. 93,786

3 Claims. (Cl. 25—154)

This invention relates to method for making ducts and relates particularly to apparatus and method for forming and thereafter seasoning ducts made of moldable material such as concrete. The word "duct" as used herein refers to hollow conduits of various forms and materials.

Heretofore ducts have been manufactured from cementitious material such as concrete employing apparatus comprising a vertical mold adapted to form the outer surface of a duct formed within the mold. The mold has been placed on a suitable support and a former has been used which is inserted within the mold to form the hollow core of the duct. In using such apparatus the concrete is poured into the vertical mold and the former head which can be raised and lowered as well as rotated is moved from the bottom of the mold to the top while being rotated. The former head compacts the moldable material such as concrete against the outer wall of the mold and trowels the inner surface of the mold so as to make it as smooth as possible. Upon removal of the former from the interior of the mold, the mold is removed from the support and the duct which has been formed within the mold is removed from the mold. The manufacture of the duct is completed by permitting the moldable material, such as concrete, to season until it approaches its ultimate strength and rigidity.

It is a purpose of this invention to afford a mold which can be used in the manufacture of externally square concrete ducts, for example, which mold can be readily assembled and disassembled. It is a further purpose of this invention to include in the mold a pallet member which serves not only to form a portion of the outer surface of the duct molded within the mold, but also serves as a receptacle which may be used during the seasoning step in the manufacture of ducts. It is a further purpose of this invention to afford an efficient and inexpensive method of molding a duct and thereafter seasoning it in storage.

It is a feature of this invention that a mold suitable for making a square concrete duct, for example, is used which is made in two parts. One part may be referred to as the master mold section. This part of the mold is preferably the heavier of the two and carries any appurtenances such as pins, handles, and the like which are necessary for handling the mold and for accurately positioning the mold in the apparatus in combination with which the mold is used. The other part of the mold is referred to as a pallet. The pallet preferably has no attachments whatever secured thereto and consists of a metallic V-shaped member having walls preferably at about 90° with respect to each other. A novel clamping device of the character described below is used for clamping the master mold section and the pallet mold together to afford a mold adapted to form the outside surface of an externally square duct, for example.

A further feature of this invention lies in the fact that the pallet mold is adapted to afford a receptacle for supporting the formed duct. The master mold is adapted to be removed after a duct has been formed in the completed mold, leaving the formed duct supported on the pallet. The pallet preferably is not attached in any way to the clamping device, so that the molded duct can be lifted on the pallet alone and taken to storage for seasoning. In use of the apparatus, it is preferable to employ a relatively large number of pallets in relation to the number of master mold sections. In fact, only a few master mold sections are required while a very large number of pallets may be used, depending upon the number of ducts which it is desired to season simultaneously. The pallets are adapted to rest on any type of support such as a flat platform or flat car with a wall of the pallets upstanding. As hereinafter described the upstanding wall is wider than the maximum thickness of the formed duct. Consequently, when a plurality of molds have been positioned adjacently on a suitable support, the upper ends of the upstanding walls are adapted to support one or more bar members disposed transversely thereto without having the bar members contact or injure the ducts in any way. The bar members, e. g., a board, which overly the pallets can in turn be used as a support for additional pallets carrying formed ducts. Moreover, the horizontally disposed wall of the pallets which rests on the support is preferably longer than the thickness of the duct resting in the pallet mold so that it is impossible to injure the duct while it rests on the pallet mold by moving one pallet against an adjacent pallet resting on a common support.

Other purposes, features and advantages of this invention will be apparent in connection with the following description of an illustrative embodiment of this invention which is shown in the accompanying drawings, wherein Figure 1 is a side view, partly diagrammatic, of apparatus for making a molded duct such as an externally square concrete duct;

Fig. 2 is a plan of the mold shown in Fig. 1 taken on the line 2—2 of Fig. 1 and resting horizontally on a support.

Fig. 3 is a view of the mold similar to Fig. 2 with the clamping members in a different position.

Fig. 4 is an end view of a plurality of molded ducts supported by pallets comprised in a storage structure.

Fig. 5 is a side sectional view of the molding apparatus shown in Fig. 1.

Fig. 6 is a view of the apparatus taken on the line 6—6 of Fig. 5; Fig. 5 being taken on the line 5—5 of Fig. 6.

Fig. 7 is a view of the apparatus taken on the line 7—7 of Fig. 5; Fig. 5 being taken on the line 5—5 of Fig. 7.

Fig. 8 is a plan view of the clamping device with the clamping members in outwardly extended position for purpose of illustration.

The mold for forming the outside surface of an externally square duct is indicated generally by the reference character 10. The mold 10 comprises the master mold section 11 and the pallet 12. The pallet 12 is in the form of a V-shaped member and is preferably made of thin, strong metal. The master mold section 11 is preferably of somewhat heavier metal than the pallet 12 and is likewise of a V-shape. The master mold section, as shown in Figs. 1 and 6, carries pins 13 which are attached thereto and are adapted to be used in assembling the mold between a suitable support and a hopper for filling the mold, as will be referred to more in detail below. For convenience in handling the mold, the master mold section preferably has handles 14 fixed thereto.

The master mold section and pallet are maintained in assembled relation by the clamping device to be described. The clamping device comprises a plurality of V-shaped bar members 15, which are secured as by welding to a plurality of members 29 that extend longitudinally of the mold 10. The number of members 15 which are used depends upon the length of the duct to be molded. In connection with a mold for forming a duct about six to eight inches in width and five to seven feet long, three or four members 15 are usually sufficient. The members 29 maintain the spacing of the members 15 and in combination with these members afford a rigid frame or saddle in which the pallet can be placed.

At one end of each of the members 15 is link member 16. At the other end of each of the members 15 is a hook member 17. The link member 16 and the hook member 17 are hingedly attached to the ends of member 15 by hinges 18 and 19. At the other end of the link member 16, a pair of bars 20 are attached by means of hinge means 21. Pivotally attached between bars 20 by hinge pin means 22 is block 23 adapted to rotate relatively to the bars 20 and between them about the hinge pin means. In engagement with a threaded bore in block 23 is the small threaded rod 24. A lug or stop member 25 is carried by hook member 17, against the end of which the block 23 is adapted to rest when the parts are in clamping position.

In assembling the mold, the frame or saddle comprising the members 15 and 29 may be placed on a suitable support such as a horse 26. The pallet 12 is then placed in the saddle and the master mold is placed over the pallet in complementary relation thereto. At this stage of the assembly operation, the hook member 17 and the link member 16, together with the other members attached to the end of link member 16, fall away loosely as shown in dotted lines in Fig. 2.

By swinging the hook member 17 and the link member 16 about their hinges 19 and 18 so as to overlie the master mold, the pallet and master mold sections can be clamped together. During the clamping operation, the end 27 of the rod 24 is first placed in the hook portion 28 of the hook member 17 as shown in Fig. 3. By pressing the headed end of the rod 24 toward the mold, a tensioning effect is exercised on the clamping band which comprises the members 15, 16, 17 and 20. The block 23 eventually comes to rest against lug 25 as shown in Fig. 2 and is so adjusted that the tension on the parts will keep them clamped together until the operator pulls the end of rod 24 away from the mold to release the clamps. Upon releasing the clamps, the members 15 and 16 can be again swung outwardly to the position shown in dotted lines in Fig. 2. If a duct has been formed within the mold while the molds are assembled, the master mold can then be lifted away by the handles 14 from the top of the duct within the mold, leaving the molded duct supported by the pallet, which in turn rests on the frame or saddle comprising members 15 and 29. Since the pallet is not secured to the saddle, the pallet can be lifted up from this frame and laid on a suitable support as shown in Fig. 3, and as will be described more in detail below.

The molding apparatus above described can be used in connection with any suitable apparatus for forming a duct. One form of apparatus in which the mold may be used is shown for purpose of illustration and somewhat diagrammatically in Fig. 1 and in Figs. 5, 6 and 7. The mold 10 is adapted to stand vertically on the support 30. Any suitable means may be used for maintaining the mold in proper fixed position on the support 30. Preferably, as shown in my application Ser. No. 93,787, filed August 1, 1936 for Apparatus for making ducts (Patent No. 2,143,449), a plate 50 is secured to the support 30 by any suitable means such as bolts 51. Guide blocks 52 are secured to plate 50 as by bolts 53. The guide blocks 52 are adapted to abut against the outer surface of the ends of the walls of master mold section 11. Abutting against the outer surface of the ends of the walls of the pallet 12 are locking lugs 54 which are fixedly carried by rods 55 that are pivoted in blocks 56 secured to plate 50. The rods 55 have crank arms 57 which can be used to rock the locking lugs into and out of locking position. In putting the mold 10 in place, its lower end is placed on the plate 50 and the master section is moved against blocks 52 while the locking lugs 54 are turned upwardly out of the way. The locking lugs may thereafter be rocked downwardly to securely hold the lower end of the mold in position. In removing the mold these operations can be performed in the reverse order of that just described.

When it is desired to make a duct having male and female ends, the dies that are used to make the male and female ends of the duct may be positioned at the top or the bottom, as may be desired. In Figs. 1, 5 and 7, a die 31 is shown which is adapted to form the female end of the duct. This die may be mounted on suitable means (not shown) for rotating the die and for lowering the die below the under surface of the support 30 as is known in the art.

To form the male end of the duct, any suitable means may be used for forming the outside of the male end of the duct, although it is regarded as preferable to use a device of the character disclosed in my application Ser. No. 93,787, filed August 1, 1936, for Apparatus for making ducts (Patent No. 2,143,449) and referred to briefly below.

At the upper end of the mold, a hopper is provided into which moldable material, such as moist concrete, may be introduced from any suitable source (not shown). This hopper is indicated generally by the reference character 32 and includes a pan member 58 having an opening 38 in the bottom thereof under which is positioned the casting member 59. The member 59 is referred to as a "casting" although other methods than a casting method may be used in the production thereof. The casting member 59 has an opening 60 therein which is grooved as shown to retain a ring 61 which is preferably made of some abrasive-resisting metal. The ring is kept in place as by arms 62 which are swingable about pins 63 so that they can be swung out of the way when it is desired to replace the ring 61.

Interposed between the casting member 59 and the top of the mold is a die pallet 64 adapted to form the outer surface of the male end of the duct. The die pallet has ears 65 having holes through which pins 13 projecting upwardly from the top of the mold are adapted to pass to keep the die pallet and mold in proper alignment. The pins 13 also are insertable in bores or recesses 75 in the bottom of the casting member 59 so that the upper end of the mold may be maintained in alignment with the hopper 32.

In order to preliminarily align the upper end of the mold with the bottom of the hopper guide blocks 66 are secured to casting member 59 as by bolts 82, the guide blocks 66 being adapted to abut against the outer surface of the upper end of the walls of the pallet part of the mold. Oppositely disposed with reference to the blocks 66 is a pin 67 having a tapered end 68 which is adapted to be partly inserted in a tapered hole 69 in bracket 70 secured to master section 11 of the mold. The pin 67 is resiliently mounted in any suitable way (not shown) so as to be resiliently urged outwardly for maintenance in pressure contact with the bracket 70. The pin 67 normally tends to occupy the position shown in dotted lines in Fig. 5. When, however, the mold 10 is brought against the blocks 66 and underneath the hopper and the hopper is lowered to position at the end of the mold, the pin 67 is pushed inwardly to the position shown in solid lines in Fig. 5, while maintaining pressure contact with bracket 70. This keeps the mold 10 and hopper 32 in preliminary alignment throughout a substantial part of the movement of the hopper in being lowered to position at the upper end of the mold and insures the entry of pins 13 into recesses 65 without jamming.

The hopper is preferably adapted to be raised and lowered as this is desirable in facilitating the positioning of the mold 10 between the hopper 32 and the support 30. The hopper may be raised, for example, by one or more rods such as the rod 33 which is attached to the hopper by a bracket 34. Any suitable means (not shown) for raising and lowering the rods may be used. Preferably, the support 30 is adapted to be moved horizontally relatively to the hopper. For example, the support 30 may be rotatable about a pivot 35. This permits the mold to be placed on the support 30, and then brought under the hopper 32 while the hopper 32 is elevated. The hopper 32 can then be lowered so as to engage the upper end of the mold 10 and hold it firmly in place.

After the mold 10 has been put in place between the support 30 and hopper 32 the interior of the mold may be formed by a core former 36 which is secured to the end of shaft 37. Any suitable means (not shown) may be used for elevating and lowering the core former 36 within the mold 10 and for rotating the core former while it is being raised and lowered. The core former 36 preferably includes a head 46 and some suitable trowelling compactor 45 which is adapted to compact material such as concrete against the side wall of the mold 10 and trowel it to a smooth surface. Any suitable arrangement of head and trowelling compactor may be used, of which many types are known, although it is regarded as preferable to employ a core former device of the character disclosed in my application Serial No. 93,785 filed August 1, 1936, for Core former for making ducts (Patent No. 2,143,448) particularly in molding a duct having 90° corners such as the externally square ducts which can be molded in the molds herein described. The shaft 37 and the rod 33 can be maintained in suitable guide bushings 39 in brackets 42 attached to frame 43.

In using the device the saddle comprising members 15 and 29 is placed on the horse 26, for example, with the hingedly attached clamping members swung out of the way. The pallet 12 is then placed in the saddle and the master section is placed thereover and clamped in position as herein above described. The mold is then turned upright and the die pallet 64 is placed on the upper end of the mold by sliding the holes in ears 65 over the pins 13. The mold is then placed with its lower end on support 30 and the lower end of the mold is positioned firmly thereon as described above. The support 30 is moved so as to bring the upper end of the mold underneath the hopper 30 and when it reaches this position the die 31 for forming the female end of the duct is elevated through an appropriate opening in the support 30 (and in plate 50) e. g., as shown in Fig. 5. The hopper 32 is then lowered and the aligning means above described brings the hopper into exact alignment with the upper end of the mold as the hopper is lowered in a rapid and easily operable manner.

The core former can then be positioned adjacent the bottom of the mold 10 and concrete, for example, in an amount approximately sufficient to form a duct within the mold is introduced from the hopper 32 through the opening in the bottom thereof into the mold. The core former is rotated and gradually elevated upwardly through the entire length of the mold and is withdrawn entirely from the mold through the opening in the bottom of the hopper 32. This forms the duct 80 within the mold. During the molding operation the die 31 can be rotated and subsequently withdrawn below support 30.

After a duct has been molded in the mold 10, the hopper 32 is raised, and, if desired, the support 30 can be moved so that the mold 10 containing the molded duct is moved to one side. The die pallet 64 is then removed and the mold containing the formed duct can be placed on a suitable suport such as the horse 26. By releasing the clamps and removing the master mold section, the formed duct will be left supported by the pallet 12 in the manner hereinabove described. The master mold section can be removed from the formed concrete duct while the concrete is very wet and while it still lacks structural strength. The manufacture of the duct is then completed by permitting the concrete to season for a considerable period of time in storage.

Without removing the molded duct from the pallet 12, the duct 80 while resting in the pallet can be transferred to a suitable support 40 which may be the floor of a car having wheels 44. No special equipment or racks is necessary, as all that is required is a horizontally extending support adapted to receive the pallets thereon. The pallets are merely laid on the support with one wall flatwise and the other wall upstanding. Since the pallets are V-shaped, they have high resistance to bending and will not sag. After a plurality of the pallet molds have been placed contiguously on the support, one or more bars 41, such as boards, may be placed on top of the upper ends of the upstanding walls of the pallet molds 12 in transverse relation to the individual pallets thereunder. If only one bar is used it should preferably be wide enough to constitute a support for additional pallets placed thereover. The bar or bars cannot injure the soft ducts underneath, inasmuch as the upstanding walls of the pallet molds are somewhat wider along the inner surface thereof in a direction perpendicular to the line of juncture of the walls of the pallets than the thickness in a similar direction of the ducts carried thereby so that the upper ends of the walls are higher than the tops of the ducts in the pallets. The upper surface of bars 41 in turn afford a support for additional pallets carrying formed ducts. If desired, any number of superposed rows of ducts carried by pallet molds may be stored for seasoning in this manner.

While the pallets are used to form a part of a storage structure for storing ducts during seasoning thereof, the master mold sections are immediately rendered free for reuse in the manufacture of additional ducts after the master sections are taken from the pallets. Thus a relatively few master sections are required for the manufacture of ducts according to this invention, even though the ducts remain in the pallets during the seasoning part of the manufacture of the ducts.

With the method of this invention ducts can be molded and seasoned in a rapid and efficient manner. The molds can be assembled and placed into the machine in proper alignment very rapidly. After the molding operation a part of the mold itself becomes a part of a storage structure. In this way green ducts can be handled without any danger of breakage on pallets which, while wholly free of any appurtenances, are adapted to become an integral part of a rigid mold. Moreover, the clamping means for the molds are removable from the pallets so that the pallets merely have to be lifted from the clamping means and taken directly to storage. The fact that the pallets are free from appurtenances enables the pallets to be purchased in large numbers at low cost and renders them better adapted for use in a structure for storing ducts. When the ducts are disposed on the pallets they can be arranged compactly in a minimum of space on supporting means which is very inexpensive but nevertheless affords protection from damage to ducts.

While certain specific embodiments of this invention have been shown and described herein, it is to be understood that this has been done merely for the purpose of illustration and that apparatus embodying this invention may be made in various forms. Accordingly the scope of this invention is to be regarded as limited only by the language of the following claims.

I claim:

1. A method of manufacturing and seasoning a plurality of ducts which comprises molding a plurality of ducts in molds including V-shaped pallets of similar cross-section, one wall of which protrudes beyond the side surface of the molded duct so that when said pallet is laid on its side with the protruding wall upstanding the top edge of the protruding wall is at a greater elevation than any part of said duct, dismantling the molds without removing the molded ducts from the pallets, and seasoning the molded ducts with the protruding walls of a plurality of contiguous ducts upstanding and with the molded ducts resting on the other wall of said pallets, said upstanding walls of said pallets acting as supports for additional of said pallets having molded ducts resting thereon.

2. A method of manufacturing and seasoning a plurality of ducts which comprises molding a plurality of ducts of square external cross section in molds including a V-shaped pallet having walls at approximately 90° to each other and at least one wall protruding beyond the side surface of said molded duct so that when said pallet is laid on its side with the protruding wall upstanding the top edge of the protruding wall is at a greater elevation than any part of said duct, dismantling the molds without removing the molded ducts from the pallets, disposing a plurality of the pallets in contiguous relation on a horizontally extending support with the protruding walls thereof upstanding and with the ducts resting on the other walls and depositing additional pallets with ducts resting thereon so as to be supported by said upstanding walls of said pallets on said support.

3. A method of manufacturing and seasoning a plurality of ducts which comprises molding a plurality of ducts of square external cross-section in molds including a V-shaped pallet having walls at approximately 90° to each other and at least one wall protruding beyond the side surface of said molded duct so that when said pallet is laid on its side with the protruding wall upstanding the top edge of the protruding wall is at a greater elevation than any part of said duct, dismantling the molds without removing the molded ducts from the pallets, disposing a plurality of the pallets in contiguous relation in a horizontally extending support with the protruding walls thereof upstanding and with the ducts resting on the other walls, disposing a plurality of bars upon the upper ends of the upstanding walls of said pallets transversely with respect to the individual pallets, and disposing additional pallets with molded ducts resting thereon on said bars and transversely thereof.

INNIS O'ROURKE.